United States Patent
Olsson et al.

(10) Patent No.: US 6,611,588 B1
(45) Date of Patent: Aug. 26, 2003

(54) SUPPORT FOR CHANGE OF NUMBERS

(75) Inventors: Björn Olsson, Klässbol (SE); Mikael Larsson, Karlstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/914,565

(22) PCT Filed: Feb. 29, 2000

(86) PCT No.: PCT/SE00/00398

§ 371 (c)(1),
(2), (4) Date: Dec. 10, 2001

(87) PCT Pub. No.: WO00/52912

PCT Pub. Date: Sep. 8, 2000

(30) Foreign Application Priority Data

Mar. 1, 1999 (SE) ................................................ 9900745

(51) Int. Cl.⁷ .......................... H04M 3/42; H04M 3/54; H04M 7/00
(52) U.S. Cl. ............................ 379/221.14; 379/207.12; 379/211.02; 379/221.13
(58) Field of Search .................. 379/211.02, 212.01, 379/219, 220.01, 221.01, 221.02, 221.13, 229, 230, 207.12, 221.14

(56) References Cited

U.S. PATENT DOCUMENTS

| | | | | |
|---|---|---|---|---|
| 5,237,604 A | * | 8/1993 | Ryan | 379/221.14 |
| 5,832,061 A | * | 11/1998 | Rubin | 379/88.1 |
| 5,848,140 A | | 12/1998 | Foladare et al. | 379/201.01 |
| 6,134,316 A | * | 10/2000 | Kallioniemi et al. | 379/220.01 |

FOREIGN PATENT DOCUMENTS

| | | | |
|---|---|---|---|
| EP | 0753975 A2 | 1/1997 | H04Q/3/00 |
| WO | WO98/18270 | 4/1998 | H04Q/3/00 |

\* cited by examiner

*Primary Examiner*—Harry S. Hong

(57) ABSTRACT

A method for routing calls to telephony devices when the telephone numbers used to identify the telephony devices have been converted from an old numbering scheme to a new numbering scheme. The method includes the steps of: receiving a call request for one of the telephony devices; examining at least a portion of a telephone number in the call request to determine whether one or more digits correspond to an old series of telephone numbers having a first numbering scheme that have been converted to a second numbering scheme; and, if the telephone number corresponds to a telephone number that has been changed to the second numbering scheme: i) determining the one or more digits to be appended to the telephone number to convert it to the second numbering scheme; ii) appending the one or more digits to the telephone number to obtain a now telephone number for the telephony device; and completing the call request using the new telephone number.

3 Claims, 1 Drawing Sheet

SUPPORT FOR CHANGE OF NUMBERS

TECHNICAL FIELD

This invention relates to a method for routing calls to telephony devices when the telephone numbers used to identify the telephony devices have been converted from an old series of telephone numbers having a first numbering scheme to a new series of telephone numbers having a second numbering scheme.

CURRENT TECHNOLOGY

When telecommunication networks for calls between subscribers via telephone, fax, computers or other methods are enlarged or changed there is often a need to carry out changes to the numbering schemes which are used to direct the calls. Normally number changes are carried out gradually, so that both the new and the old number for a subscriber are valid during a transitional period, for example for up to a year. After this for a further period of time a subscriber calling the old number is informed that a number change has occurred, and finally after a certain period of time the old number is removed.

The technology used today is that during the transitional period both the old and the new number are recorded in the network for each subscriber, and so while number changes are taking place double capacity is required for the storage of numbers. Where the subscriber has a portable number, that is when the subscriber has the ability to retain his number when he moves house or changes telecommunications operator, particularly great demands are made on capacity for storage of subscriber numbers in connection with numbering scheme changes. In addition information associated with the old number must be updated in two different places during the numbering scheme change, the first time when the call to the old number is to be directed to information that the number change has occurred, and the second time when the old number is to be removed. This is expensive in terms both of time and money, particularly when the change concerns very large numbering schemes.

AIM OF THE INVENTION

The aim of the invention is to make it simpler and cheaper to carry out numbering scheme changes. An additional aim is also to make easier numbering scheme changes for portable numbers.

DESCRIPTION OF THE INVENTION

The aim of the invention is achieved by determining by means of an analysis whether the number belongs to the old or the new numbering scheme and if the analysis shows that the number belongs to the old numbering scheme it is converted by means of a conversion algorithm in a first database to a number according to the new numbering scheme, after which directing is carried out on the basis of the number according to the new numbering scheme. By this means only the number according to the new numbering scheme needs to be defined in the network. An important simplification is achieved if numbers which are found by the identification to belong to the new numbering scheme or which have been converted to the new numbering scheme are allocated directing information from a second database comprising only the new numbering scheme and thereafter are directed onwards on the basis of this directing information. As a result the need for number storage is reduced considerably, as the second database can comprise only numbers according to the new numbering scheme. A particular simplification is obtained if directing information from the second database is only allocated to portable numbers according to the new numbering scheme.

A further simplification is achieved by using a separate conversion algorithm in the first database for each number group in the old numbering scheme.

In the proposed device according to the invention the computer unit is arranged to determine whether the number belongs to the old or the new numbering scheme and is provided with a first database which is arranged to convert a number according to the old numbering scheme to a number according to the new numbering scheme by means of a conversion algorithm so that the network only needs to direct calls on the basis of numbers according to the new numbering scheme. The first database is suitably arranged to transfer the new number to a second database which is arranged to allocate directing information only to numbers according to the new numbering scheme. The second database can advantageously contain only portable numbers according to the new numbering scheme. In particular there is a separate conversion algorithm in the first database for each number group. This means that the second database can be made considerably smaller than previously, with a resultant simplification and saving.

Further advantages and characteristics of the invention are described in the patent claims and description.

DESCRIPTION OF THE FIGURES

In the following the invention will be described in greater detail utilizing an example of a preferred embodiment shown in the attached figures, in which.

DESCRIPTION OF PREFERRED EMBODIMENT

Figure 1:
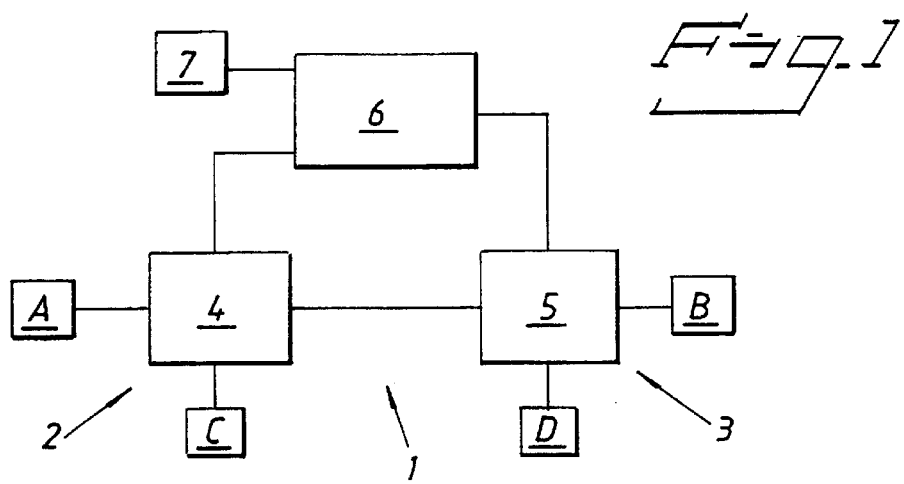
FIG. 1 shows a block diagram of a communication system which comprises a device according to the invention.

FIG. 1 shows a telecommunications system 1 of the intelligent network type where a number of subscribers, for example A, B, C and D, are connected for communication with each other, for example by telephone, fax, computer or other suitable means. The subscribers A and C are in a first network 2, while the subscribers B and D are in a second network 3. The networks 2 and 3 can either be fixed networks or mobile networks. The number of subscribers in each network can be considerably higher than as shown here, and similarly the number of different networks can be other than as shown.

Networks 2 and 3 are each provided with stations 4 and 5 respectively via which the subscribers can be connected to each other, in pairs or in groups. Common to both networks 2 and 3 there is a service exchange 6, which communicates with the stations 4 and 5. The service exchange 6 can be common to a number of networks and can therefore be located geographically at a great distance from the various stations which it is intended to serve. At a higher level in the telecommunications system 1 a number of service exchanges 6 each with their associated network structure can be connected to each other. Within or connected to the service exchange 6 there is a computer unit 7 which in this case is intended to handle the numbering schemes for the network.

The communication system 1 can handle ordinary telecommunications traffic by telephone, fax and various types of data traffic in the usual way. Using the service exchange 6 the opportunity is also provided for new and improved services, as described below.

A common problem within telecommunications is the changing of numbering schemes. In addition nowadays there are often demands for number portability, that is a subscriber can retain his number when he changes telecommunications operator or moves house.

According to the invention a numbering scheme change can be handled as follows. Subscriber A wants to reach subscriber B and therefore dials the number he knows for subscriber B, for example 0570-61001. Without A being aware of it there has, however, been a numbering scheme change for subscriber B, so that his new number is now for example 0570-461001, that is the number 4 has been inserted before the last number group. When subscriber A dials his number for subscriber B the call comes first to the station 4 which asks the service exchange 6 how the call is to be directed in the system 1 and receives the necessary message via the computer unit 7 and directs the call onwards to station 5. If necessary station 5 can in turn need to ask an associated service exchange how the call is to be directed via one or more further stations in order to reach subscriber B.

Figure 2:
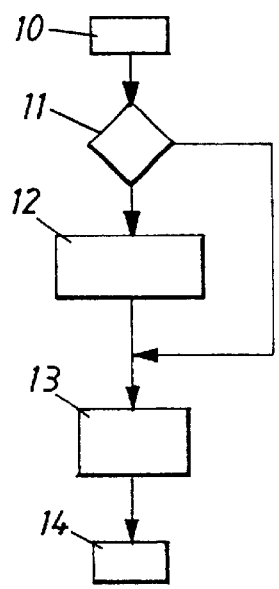
FIG. 2 shows a flow diagram.

FIG. 2 shows in greater detail what happens to the call from subscriber A when it reaches the computer unit 7 in or connected to the service exchange 6. The subscriber number, for example 0570-61001, entering stage 10 as above is analyzed in stage 11. If the subscriber number is found to belong to the old numbering scheme a conversion of the number to a number according to the new numbering scheme takes place in the next stage 12 using a conversion algorithm in a first database. By this means it is possible for all numbers in a number group, for example of the type 0570-61xxx, to use a common conversion algorithm in order to change all numbers in this number group to 0570-461xxx by inserting the number 4 as the first digit in the number. If, however, the subscriber number in stage 11 is found to belong to the new numbering scheme, stage 12 is omitted. In the next stage 13 it is determined in a second database which directing information has been allocated to each number according to the new numbering scheme. In a further stage 14 the call is directed onwards to a suitable station using the directing information obtained.

Figure 3:
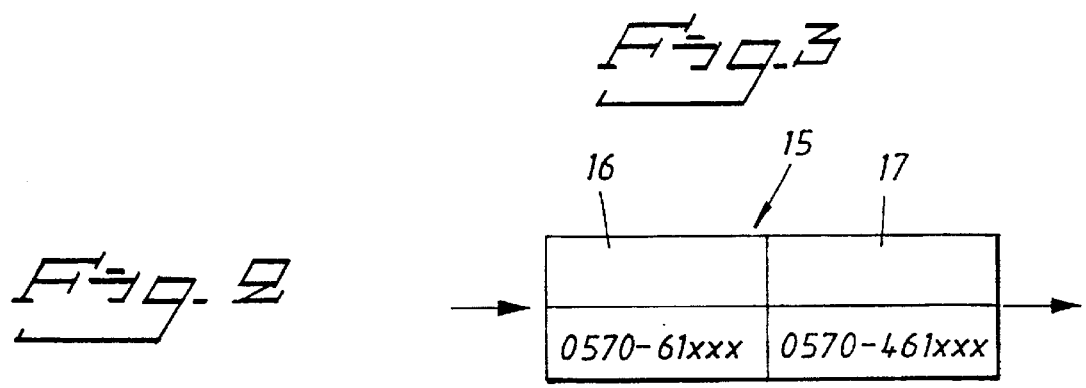
FIG. 3 shows the construction of a first database.

FIG. 3 shows the diagrammatic construction of a first database of the type which is used in stage 12, where a first database 15 has a register 16 containing one or more number groups and a conversion algorithm 17 where the number is converted, for example by as here inserting the number 4 into the number according to the old numbering scheme, so that a number according to the new numbering scheme is obtained.

Figure 4:
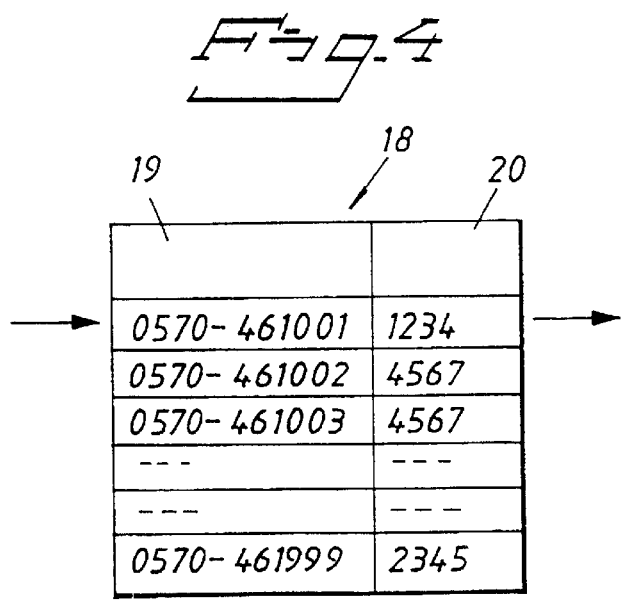
FIG. 4 shows the construction of a second database.

FIG. 4 shows the diagrammatic construction of a second database of the type which is used in stage 13, where a second database 18 has a register 19 containing numbers according to the new numbering scheme and a register 20 containing directing information for each number in the register 19.

In this embodiment the register 19 can contain both portable and non-portable numbers and number groups. This means that the register 20 can contain different types of directing information, depending upon whether the number concerned is portable or not. If the number is not portable no special directing information is required, but the number in its existing state can be used to direct the call. However, if the number is portable, the necessary directing information is obtained from the register.

It is also possible to allow the second database 18 to comprise only portable numbers and/or number groups. In such a case it is expedient to insert a selection stage immediately before the stage 13, in which selection stage it is determined whether the number is portable or not. Portable numbers are then handled in stage 13, while stage 13 is omitted for non-portable numbers.

Both the first and the second databases are incorporated as mentioned in a computer unit 7 which is suitably located in or connected to the service exchange 6 and which can advantageously also be utilized for other services which can be appropriate in a communication system of the intelligent type.

It is also possible according to a variant of the embodiment of a communication system 1 shown in FIG. 1 to connect the computer unit 7, or a part of this, directly to a station 4. This makes possible efficient handling of numbering schemes and changes in these directly at the station. Handling of number portability can still be carried out via the service exchange 6 with associated computer unit. This type of solution means that a network which has not yet been enlarged with one or more service exchanges 6 and which therefore is not yet of the intelligent type can still handle numbering scheme changes and can later be enlarged with a service exchange 6 in order also to be able to handle number portability.

If there is no need to support number portability the computer unit 7 does not need to be provided with a second database 18, but it is sufficient to have a first database 15 for the conversion of old numbers, as in this case call directing can be carried out directly on the basis of the number concerned. In the diagram shown in FIG. 2 of what happens to a call when it reaches the computer unit 7, stage 13 is then omitted.

According to the invention it is advantageously so arranged that when a number group in the old numbering scheme ceases to be valid, the conversion in the first database 15 is closed down and for a predetermined period of time the calling subscriber is given a message to the effect that the relevant number in this number group is no longer valid. Later, when information about the number change is no longer required after the predetermined period of time, the first database is closed down. The computer unit 7 is therefore suitably designed to be able to carry out these services.

There can be several other solutions within the framework of the invention which can be implemented by specialists in the field, for which reason the invention is not restricted to the embodiment described above.

What is claimed is:

1. A method for routing calls to a plurality of telephony devices when the telephone numbers used to identify said plurality of telephony devices have been converted from an old series of telephone numbers having a first numbering scheme to a new series of telephone numbers having a second numbering scheme, wherein said second numbering scheme comprises numbers having a greater number of digits than said first numbering scheme, said method comprising the steps of:

receiving a call request for one of said telephony devices;

examining at least a portion of a telephone number in said call request to determine whether one or more digits correspond to said old series of telephone numbers that have been converted to said second numbering scheme; and if said telephone number corresponds to a telephone number that has been changed to said second numbering scheme:
  i) determining the one or more digits to be appended to said telephone number to convert it to said second numbering scheme;
  ii) appending said one or more digits to said telephone number to obtain a new telephone number for said telephony device; and
  iii) completing said call request using said new telephone number.

2. The method recited in claim 1, wherein said step of determining the one or more digits to be appended to said telephone number to convert it to said second numbering scheme comprises the step of querying a database using at least said portion of said telephone number.

3. The method recited in claim 1, wherein said step of appending said one or more digits to said telephone number to obtain said new telephone number comprises the step of adding said one or more digits to the beginning of said telephone number.

* * * * *